United States Patent [19]

Gershony

[11] Patent Number: 5,079,721
[45] Date of Patent: Jan. 7, 1992

[54] APPARATUS FOR GENERATING A SCREENED REPRODUCTION OF AN IMAGE

[75] Inventor: Moshe A. Gershony, Kefar-Sava, Israel

[73] Assignee: Scitex Corporation Ltd., Herzliya, Israel

[21] Appl. No.: 524,859

[22] Filed: May 18, 1990

[51] Int. Cl.⁵ ............................................. G06K 15/00
[52] U.S. Cl. ................................................... 395/132
[58] Field of Search ........................... 364/518–521, 364/235 MS, 237.7 MS, 930 MS, 929.3 MS; 340/700–704; 358/296, 298; 346/157

[56] References Cited

U.S. PATENT DOCUMENTS

| | | | |
|---|---|---|---|
| 3,916,096 | 10/1975 | Everett et al. | 364/520 |
| 4,040,094 | 8/1977 | Everett et al. | 364/520 |
| 4,149,183 | 4/1979 | Pellar et al. | 364/520 |
| 4,456,924 | 6/1984 | Rosenfeld | 364/520 |
| 4,825,298 | 4/1989 | Ikuta et al. | 364/520 |

FOREIGN PATENT DOCUMENTS 2157119 10/1985 United Kingdom ............... 364/520

*Primary Examiner*—Arthur G. Evans
*Attorney, Agent, or Firm*—Cushman, Darby & Cushman

[57] ABSTRACT

A technique for generating a screened reproduction of an image comprising the steps of providing a representation of an original having input density values representing the grey levels of various locations of the original for a given color separation, defining a desired screen dot arrangement for the image, writing screen dots in a line by line fashion, wherein each screen dot is made up of a plurality of lines whose length and location determines the dot configuration and whose length and location is determined by an analog operation employing the input density values of the original and the desired screen dot arrangement. Apparatus employing the method is also provided.

14 Claims, 10 Drawing Sheets

APPARATUS FOR GENERATING A SCREENED REPRODUCTION OF AN IMAGE

FIELD OF THE INVENTION

The present invention relates to screened image production and more particularly to a method and apparatus for electronically generating a screened reproduction of an image.

BACKGROUND OF THE INVENTION

Electronic screening for image reproduction is well known in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded by threshold values, defining a cell memory matrix. Input digitized scanned density values of an image, such as a color separation, are compared with the threshold values, cell by cell. The results provide a on/off control input for a laser plotter.

U.S. Pat. No. 4,149,183 describes an electronic halftone generator wherein a halftone signal is generated by pulse width modulating or comparing the scanned or video signal with a periodic analog signal having two frequencies and phases to create a dot pattern output which is a function of the frequency and phase of the two combined modulating signals. The halftone reproduction generated has variable dot configurations that are controllable to enable both rotation of the dot pattern and geometric modifications of the dot pattern.

SUMMARY OF THE INVENTION

The present invention seeks to provide an improved technique for generating a screened reproduction of an image.

There is thus provided in accordance with a preferred embodiment of the present invention a technique for generating a screened reproduction of an image comprising the steps of:

providing a representation of an original having input density values representing the grey levels of various locations of the original for a given color separation, defining a desired screen dot arrangement for the image, writing screen dots in a line by line fashion, wherein each screen dot is made up of a plurality of lines whose length and location determines the dot configuration and whose length and location is determined by an analog operation employing the input density values of the original and the desired screen dot arrangement.

In accordance with a preferred embodiment of the present invention, each written line has infinite resolution along its length.

Further in accordance with a preferred embodiment of the invention, the analog operation comprises an analog comparison of the input density values with threshold values defined by the desired screen dot arrangement.

Additionally in accordance with an embodiment of the present invention, the step of writing screen dots includes the following steps:

storing the input density values of the original at a first spatial resolution and storing the threshold values of the desired screen dot arrangement at a second spatial resolution different from the first resolution.

In accordance with a preferred embodiment of the invention, the second resolution corresponds to the line to line spatial resolution of a plotter used for writing the screen dots.

Further in accordance with an embodiment of the invention, the step of storing the threshold values of the desired screen dot for a given line includes digitally storing the values at a third sampling resolution, which may be different from said first and second resolutions.

Additionally in accordance with an embodiment of the invention, the step of writing screen dots includes the following steps:

prior to plotting, defining a three dimensional representation of a screen dot arrangement, including a two dimensional space corresponding to the spatial dimensions of the image and a one dimensional value corresponding to the dot threshold value at each spatial location thereon, and a plurality of sections at a selected angle in the two dimensional space, corresponding to a screening angle, and a section-to-section spacing corresponding to the line to line writing resolution of a plotter, each section defining threshold values for locations along a line in the two dimensional space and thereafter comparing in an analog manner the input density values along the line with the threshold values of the coresponding section to determine the length and location of each written line produced by the plotter.

There is also provided in accordance with a preferred embodiment of the invention apparatus for generating a screened reproduction of an image comprising:

apparatus for providing a representation of an original having input density values representing the grey levels of various locations of the original for a given color separation, apparatus for defining a desired screen dot arrangement for the image, and apparatus for writing screen dots in a line by line fashion, wherein each screen dot is made up of a plurality of lines whose length and location determines the dot configuration and whose length and location is determined by an analog operation employing the input density values of the original and the desired screen dot arrangement.

Preferably the apparatus for writing screen dots includes:

apparatus for storing the input density values of the original at a first spatial resolution, and apparatus for storing the threshold values of the desired screen dot arrangement at a second spatial resolution different from the first resolution.

In accordance with an embodiment of the invention the apparatus for storing the threshold values of the desired screen dot for a given line includes means for digitally storing the values at a third sampling resolution, which may be different from the first and second resolutions.

In accordance with a preferred embodiment of the present invention, the apparatus for writing screen dots includes:

apparatus for defining, prior to plotting, a three dimensional representation of a screen dot arrangement, including a two dimensional space corresponding to the spatial dimensions of the image and a one dimensional value corresponding to the dot threshold value at each spatial location thereon, and a plurality of sections at a selected angle in the two dimension space, corresponding to a screening angle, and a section-to-section spacing corresponding to the line to line writing resolution of a plotter, each section defining threshold values for locations along a line in the two dimensional space, and apparatus for thereafter comparing in an analog manner the input density values along the line with the threshold values of the coresponding section to determine the length and location of each written line produced by the plotter.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
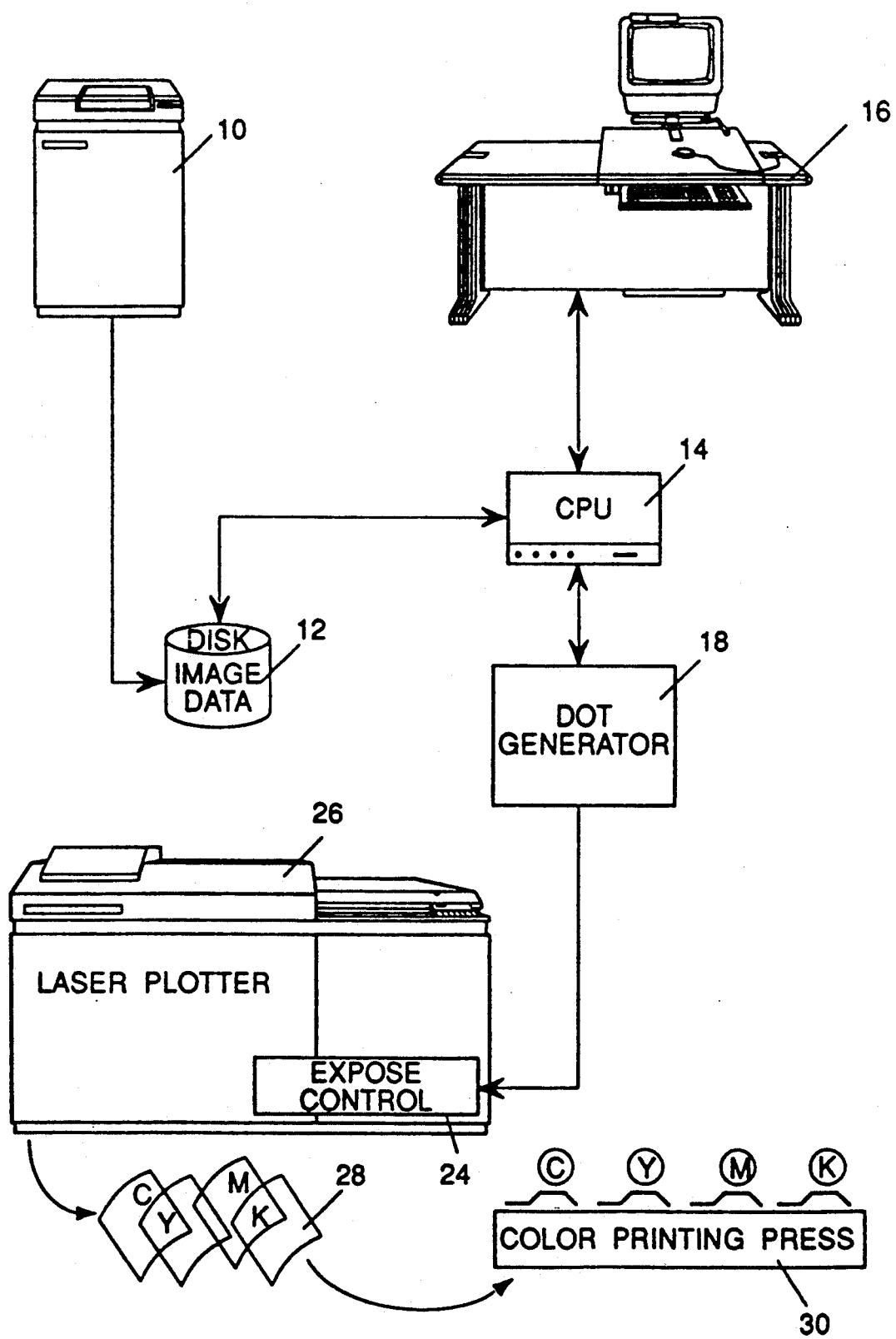
FIG. 1 is a simplified block diagram illustration of a process color printing system constructed and operative in accordance with a preferred embodiment of the present invention.

Reference is now made to FIG. 1, which illustrates a system for generating a screened reproduction of an image constructed and operative in accordance with a preferred embodiment of the present invention. The system preferably comprises a color separation scanner 10, such as a Scitex Smart Scanner, manufactured and sold by Scitex Corporation Ltd. of Herzlia, Israel, which is adapted to provide a digital color separation output of a color original.

The digital output of scanner 10 is normally stored on a image data disc 12 or any other suitable storage medium, which is accessible by a CPU 14, such as an Intel 80386. Interfacing with the CPU 14 is an interactive workstation 16, such as a Scitex Prisma, manufactured and sold by Scitex Corporation Ltd. of Herzlia, Israel.

CPU 14 interfaces with screen dot generation circuitry 18, which in turn provides a control output to laser beam control circuitry 24 in a laser plotter 26, such as a Raystar, manufactured and sold by Scitex Corporation Ltd. of Herzlia, Israel.

Laser plotter 26 produces halftone film color separations 28 which are employed in a conventional process color printing press 30, to produce process color prints.

Figure 2:
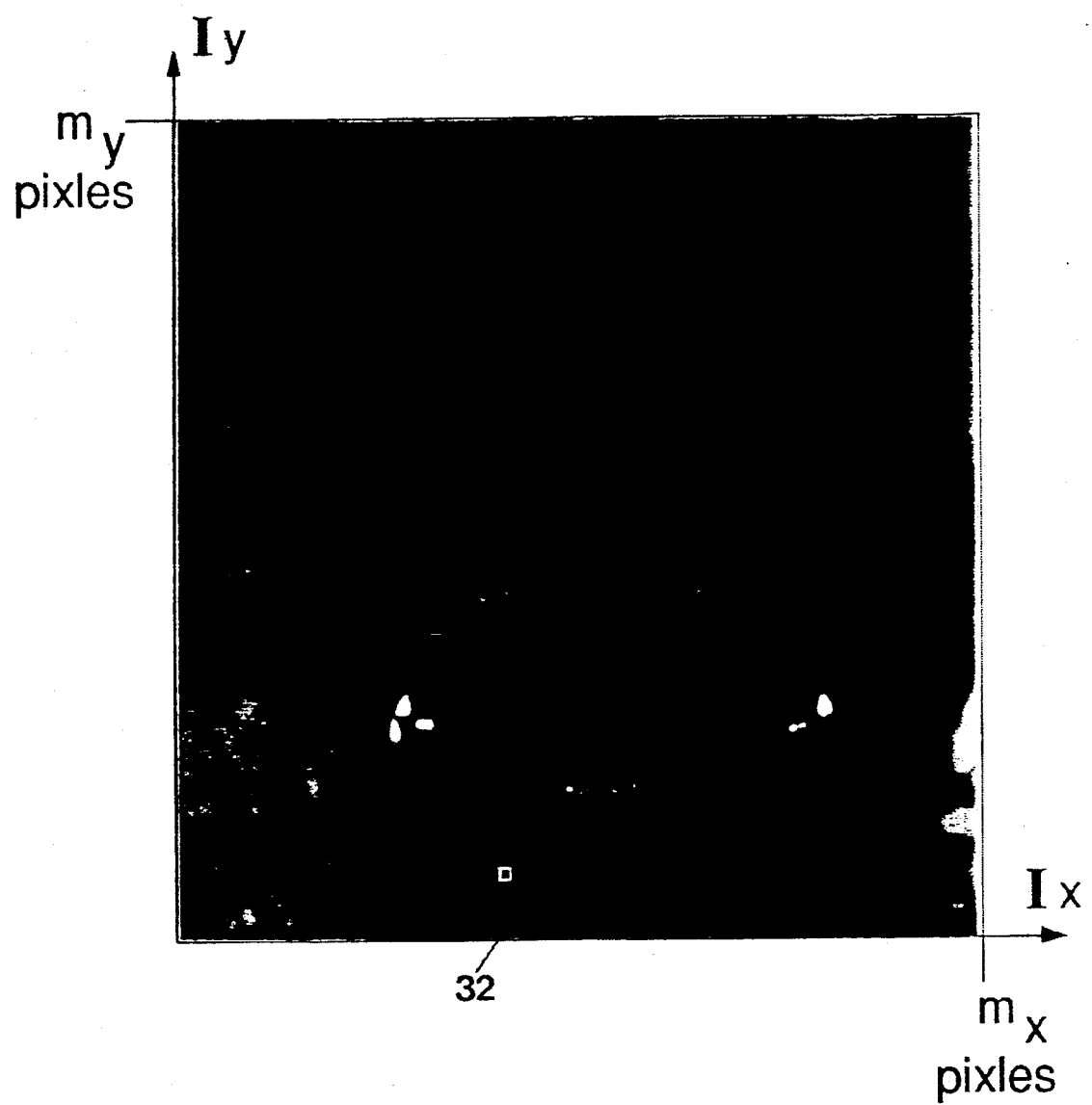
FIG. 2 is an illustration of one color separation of a typical color original.
Figure 3:
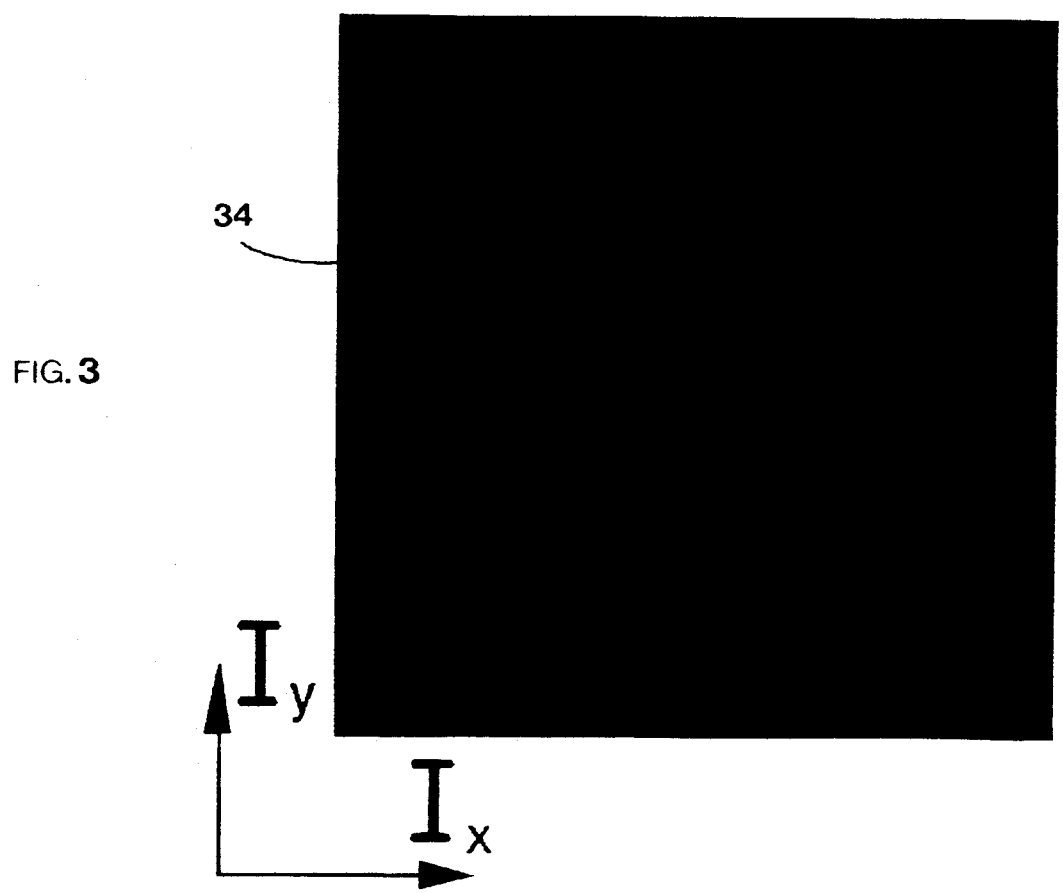
FIG. 3 is an enlarged illustration of a small portion of the halftone color separation of FIG. 2.

Reference is now made to FIGS. 2 and 3. FIG. 2 illustrates a typical halftone color separation which is stored on disc 12. FIG. 3 illustrates in enlarged detail, a small area 32 indicated on FIG. 2. It is noted that the gray level over area 32 varies thereacross.

The halftone color separation in general and the small area 32 in particular are hereinafter termed the input image and are divided into a first multiplicity of pixels 34 which are arranged along coordinates $I_x$ and $I_y$. Pixels 34 typically have a resolution of 100-400 pixels per inch along one of the coordinate axes of the input image.

Figure 4:
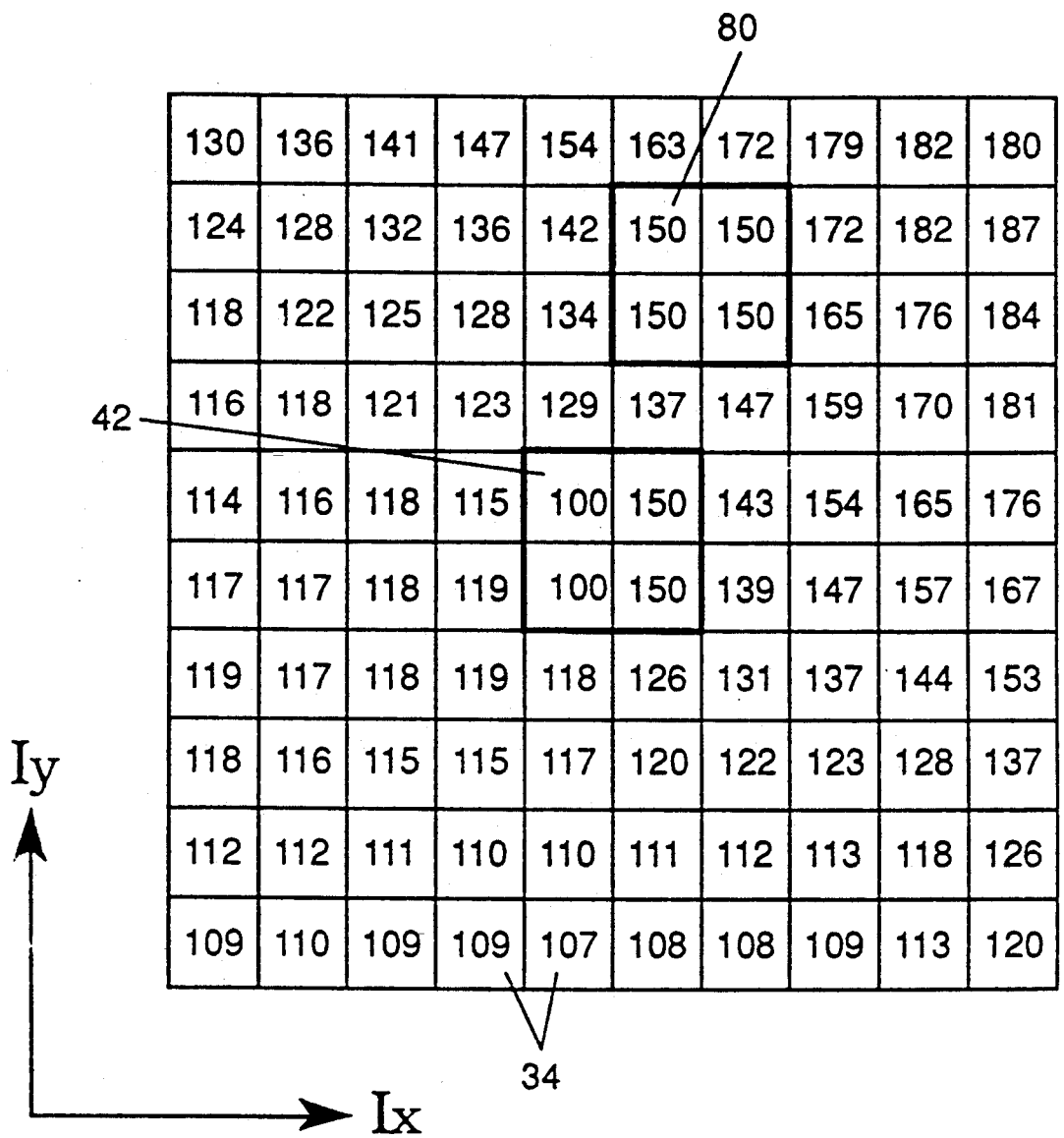
FIG. 4 is an illustration of pixel-by-pixel input density values for the small portion of the color separation of FIG. 2.

Each average gray level for a pixel 34 is represented digitally by an input density level. There are typically provided 256 different input density levels, 0 being the lightest and 255 being the blackest. FIG. 4 illustrates the input density values for the pixels 34 of FIG. 3.

Figure 5:
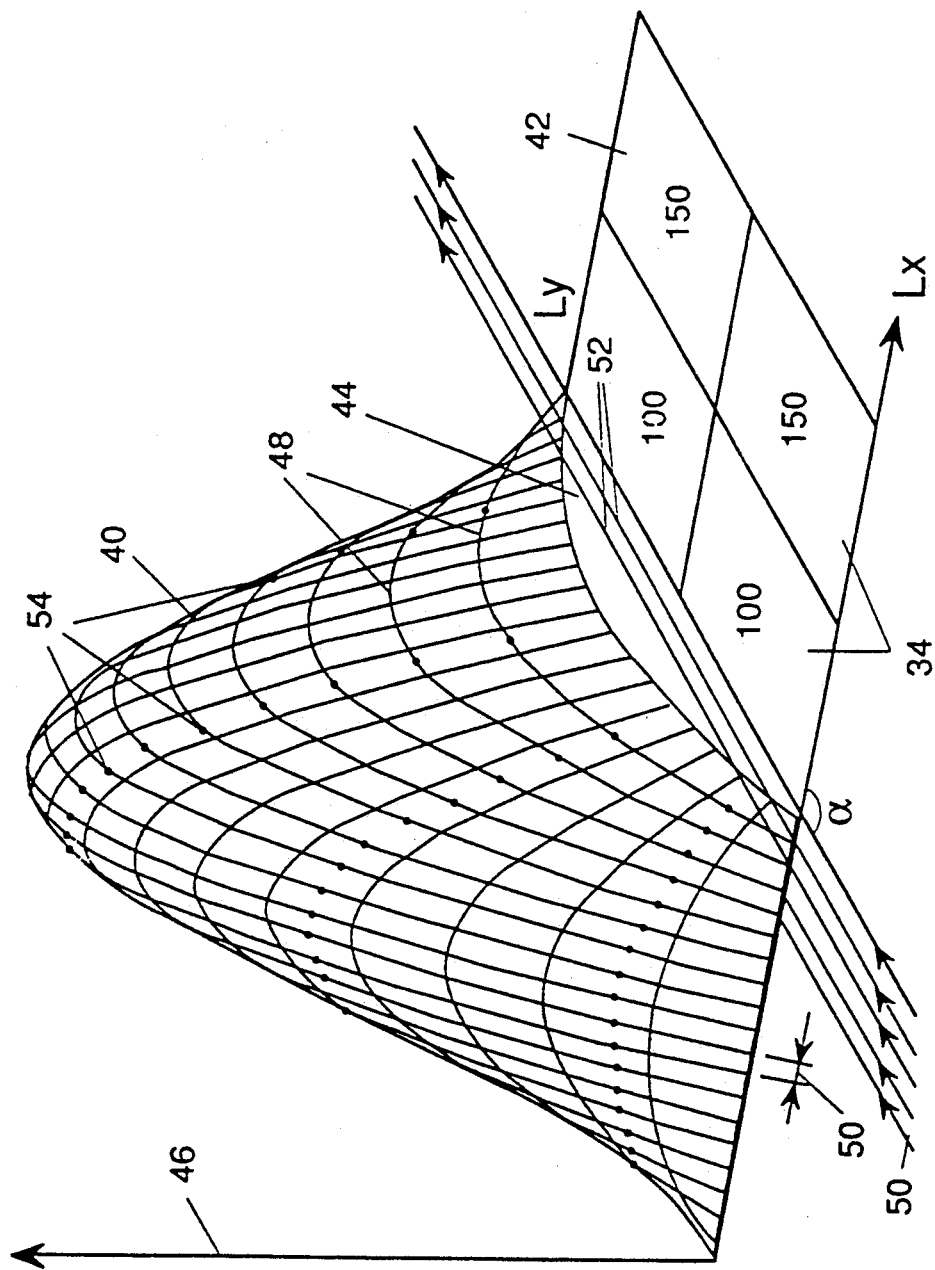
FIG. 5 is a more detailed illustration of the configuration of screen dots in three dimensional space superimposed on part of the illustration of FIG. 4.

FIG. 5 illustrates an output dot density threshold distribution 40 for a conventional dot which is used in process color printing. Alongside distribution 40 there is illustrated part of the input density map of FIG. 4, corresponding to a region there identified by reference numeral 42. It is noted that region 42 includes different density values for different input pixels 34.

The output dot density threshold distribution 40 is a three dimensional representation of a screen dot arrangement, including a two dimensional space 44 corresponding to the spatial dimensions of the image and a one dimensional value 46 corresponding to the dot density threshold value at each spatial location thereon. Distribution 40 defines a plurality of sections 48 at a selected angle $\alpha$ in the two dimensional space, corresponding to a screening angle, here 90 degrees, for example. The sections 48 are at a section-to-section spacing 50 corresponding to the line to line writing resolution of a plotter, typically 800-5000 lines per inch, each section defining threshold values for locations along a line 52 in the two dimensional space.

A collection of points, such as those indicated on distribution 40, illustrate values in the three dimensional space which are stored to define the distribution. Alternatively functions which define, inter alia, the collection of points may be stored to define the distribution. It will thus be appreciated that in accordance with a preferred embodiment of the present invention and in contrast to the prior art, the screen dot thresholds are stored either as analog functions or as discrete values in three dimensional space representing such functions.

The stored functions or points are used to calculate suitable sections 48 represented by points 54 thereon, corresponding to a selected resolution, mesh (screen dots per unit length) and screen angle. This calculation may involve extrapolation or interpolation as appropriate and is carried out in CPU 14, typically off line.

Figure 7:
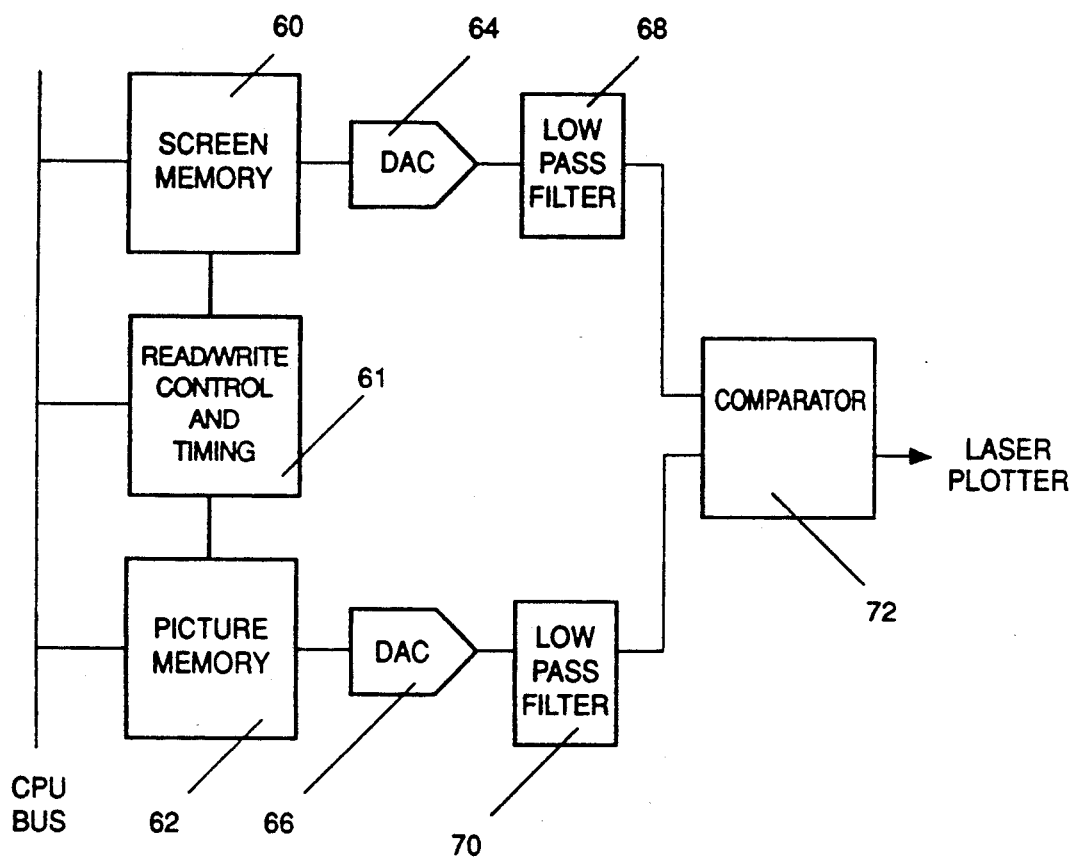
FIG. 7 is a simplified block diagram illustration of apparatus for screen dot generation operative in accordance with a preferred embodiment of the invention.
Figure 8:
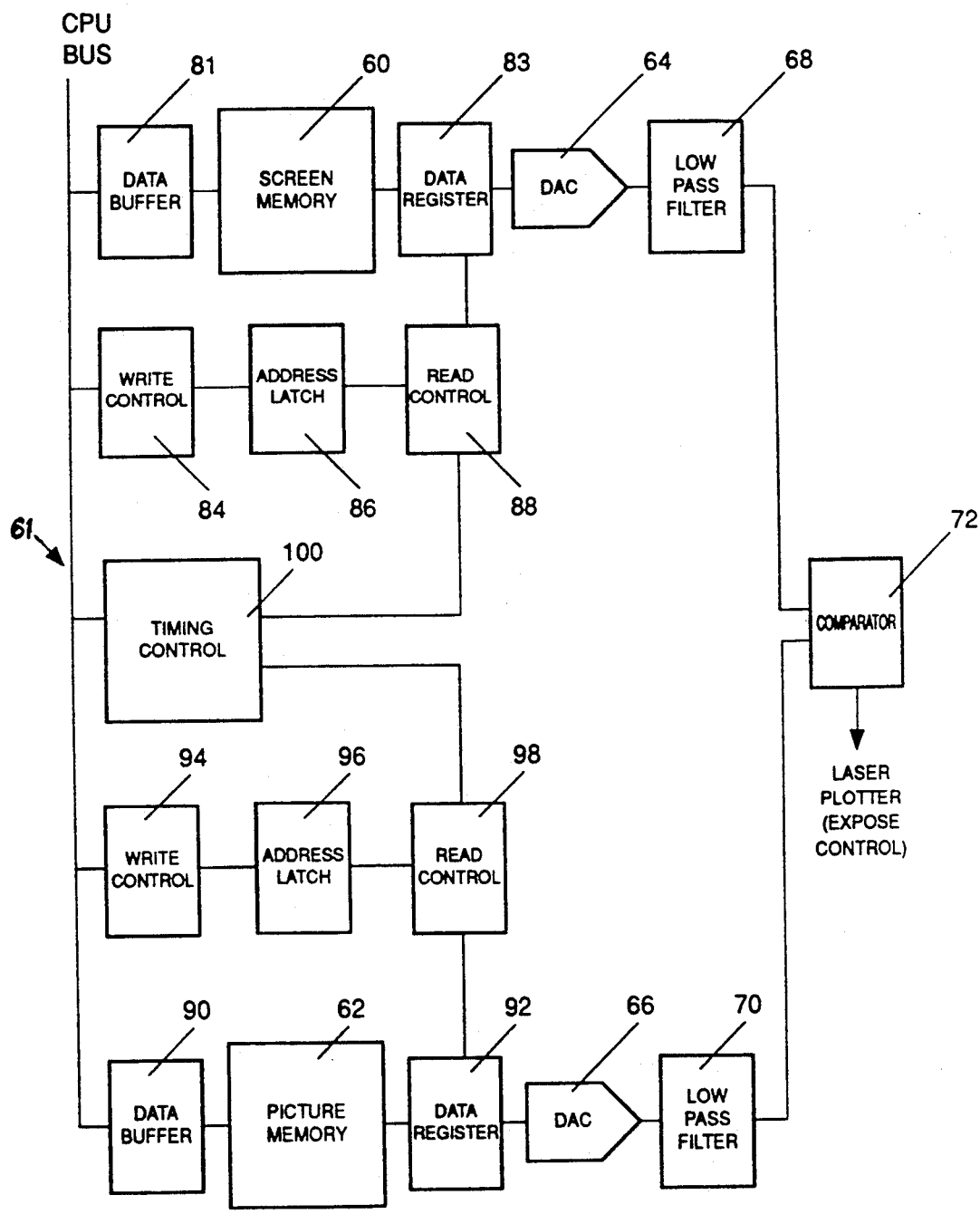
FIG. 8 is a more detailed simplified block diagram of the apparatus for screen dot generation of FIG. 7.

Referring now additionally to FIG. 7, it will be understood that the points 54 are supplied to a screen memory 60, and the input density values of pixels 34 are supplied to a picture memory 62. Screen memory 60 and picture memory 62 are typically controlled by a read/write and timing control unit 61 described in more detail in FIG. 8.

The contents of memories 60 and 62 are supplied via respective digital to analog converters 64 and 66 to respective low pass filters 68 and 70. It is noted that under certain circumstances, low pass filter 70 may be omitted.

It will be appreciated that the low pass filter 68 is adapted to extrapolate and interpolate the points 54 stored in memory 60 so as to provide an accurate reproduction of the dot density threshold. The inclusion of low pass filter 70 depends on the quality of the input image.

The outputs of low pass filters 68 and 70 are supplied to a comparator 72, which provides an output indication to expose control circuitry 24, indicating when the laser plotter 26 is to write. It is noted that there may also be provided various additional control functions, such as intensity control, to enhance the operation of the laser plotter 26.

Reference is now made to FIGS. 8 and 9A-9D which respectively are a more detailed illustration of the circuitry of FIG. 7 and a timing diagram therefor. As can be seen from FIG. 8, read/write and timing control unit 6! comprises data buffers 81 and 90, data registers 83 and 92, write control units 84 and 94, address latches 86 and 96 and read control units 88 and 98 for controlling screen memory 60 and picture memory 62, respectively. A timing control unit 100 controls the timing of the signals sent to the digital to analog converters 64 and 66.

Figure 9A:
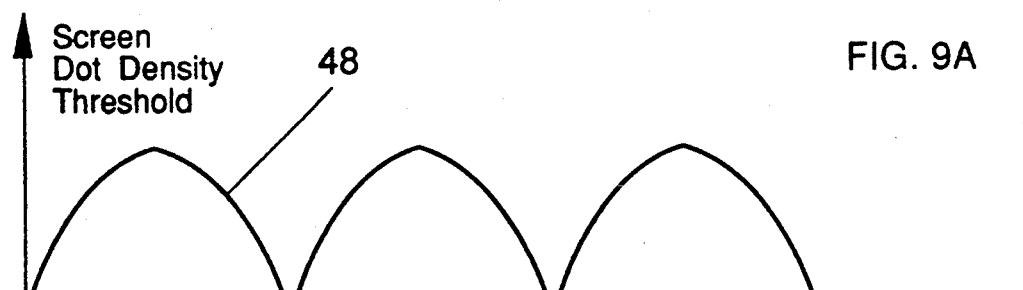
FIGS. 9A-9D are simplified timing diagrams illustrating the operation of the circuitry of FIG. 8.
Figure 9B:
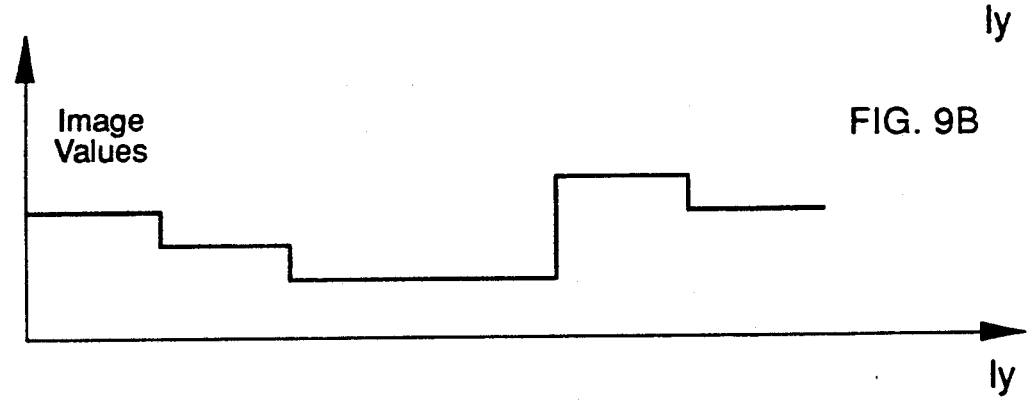

The analog output of converter 64 for an example multiplicity of screen dots stored in screen memory 60 is shown in FIG. 9A and the analog output of converter 66 for an example plurality of input density values stored in picture memory 62 is shown in FIG. 9B.

Figure 9C:
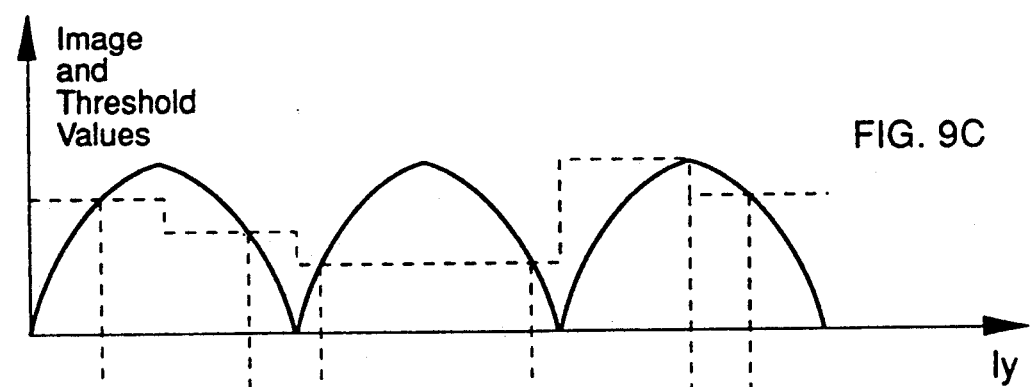
Figure 9D:
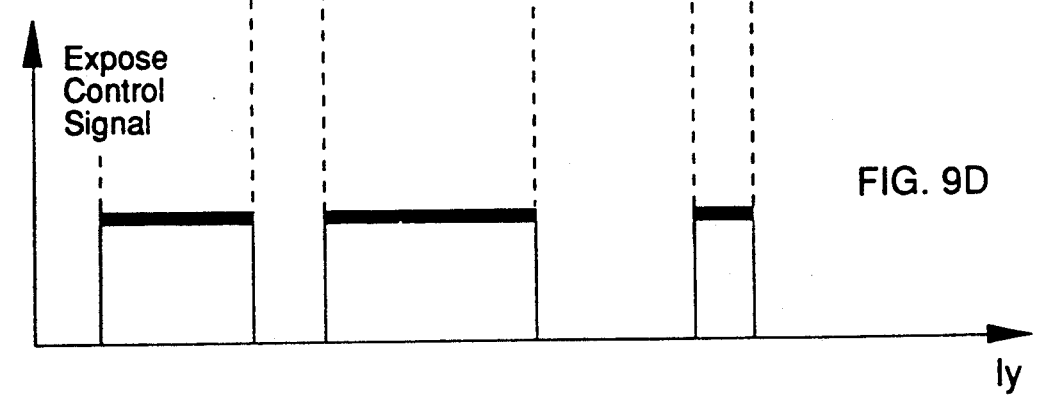

FIG. 9C illustrates the operation of comparator 72 in comparing the two signals shown in FIGS. 9A and 9B, where the signal of FIG. 9B is shown as a dotted line. FIG. 9D illustrates the resultant signal produced by the comparator 72 and used to drive expose control circuitry 24.

Figure 6A:
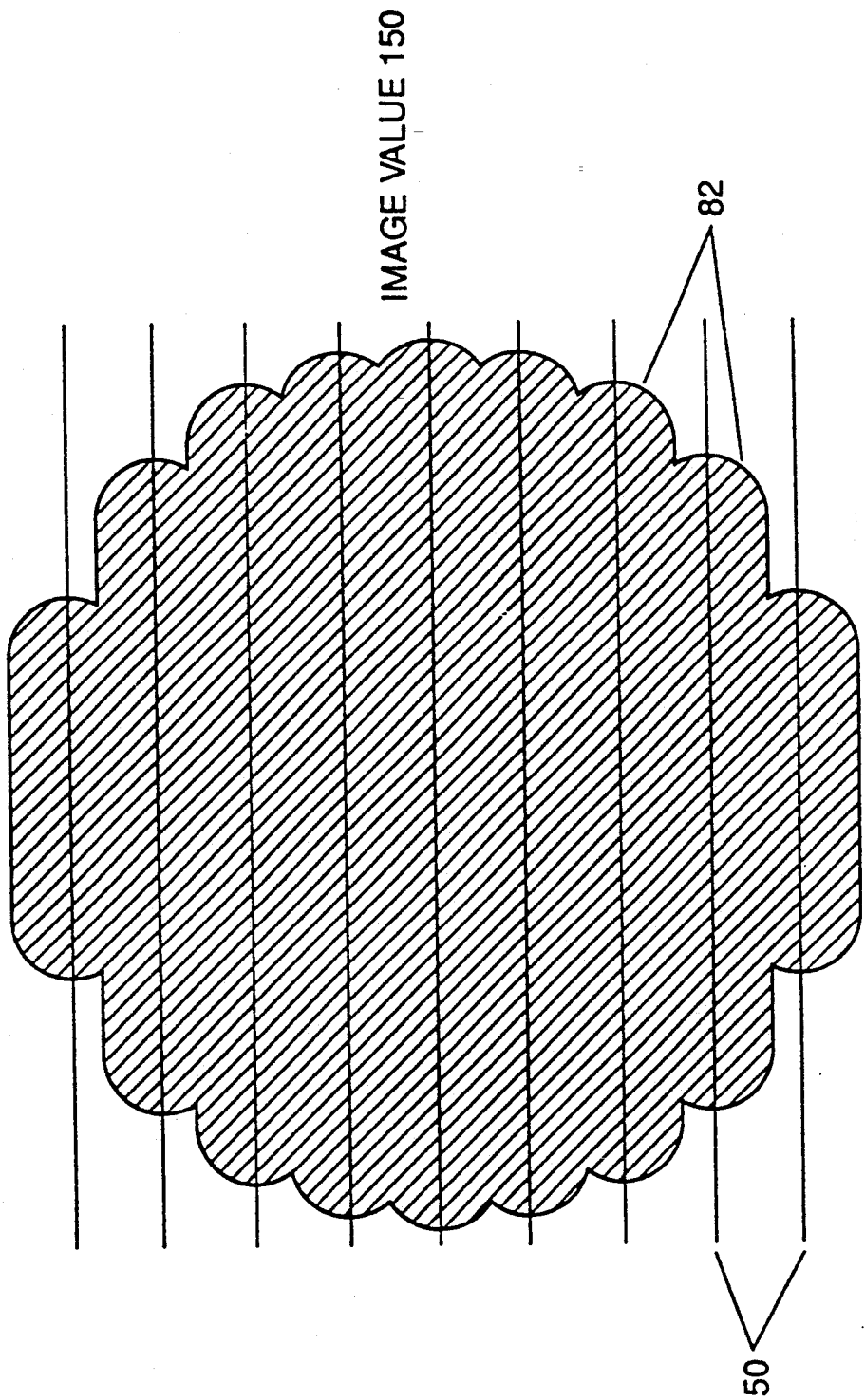
FIG. 6A is an even more detailed illustration of a line by line written screen dot produced in accordance with a preferred embodiment of the invention for a uniform input density.

Reference is now made to FIG. 6A, which illustrates the construction of an output screen dot for a portion 80 of the image illustrated in FIGS. 3 and 4. The input density values for the pixels 34 are indicated within each pixel and it is seen that they are all uniform.

The laser plotter 26 defines a plurality of parallel lines 82, having a spacing 50, and whose beginning and end are determined by the output of comparator 72. The screen dot is a composite of such lines. In a case wherein the input density values represented by the dot, i.e. in the two dimensional space 42 underlying the density threshold distribution 40 in FIG. 5, are uniform, the dot will have a generally symmetrical shape, as illustrated.

In accordance with a preferred embodiment of the present invention, each written line has infinite resolution along its length, because the on/off control inputs to the laser plotter are arrived at by comparison of two generally continuous analog signals.

Figure 6B:
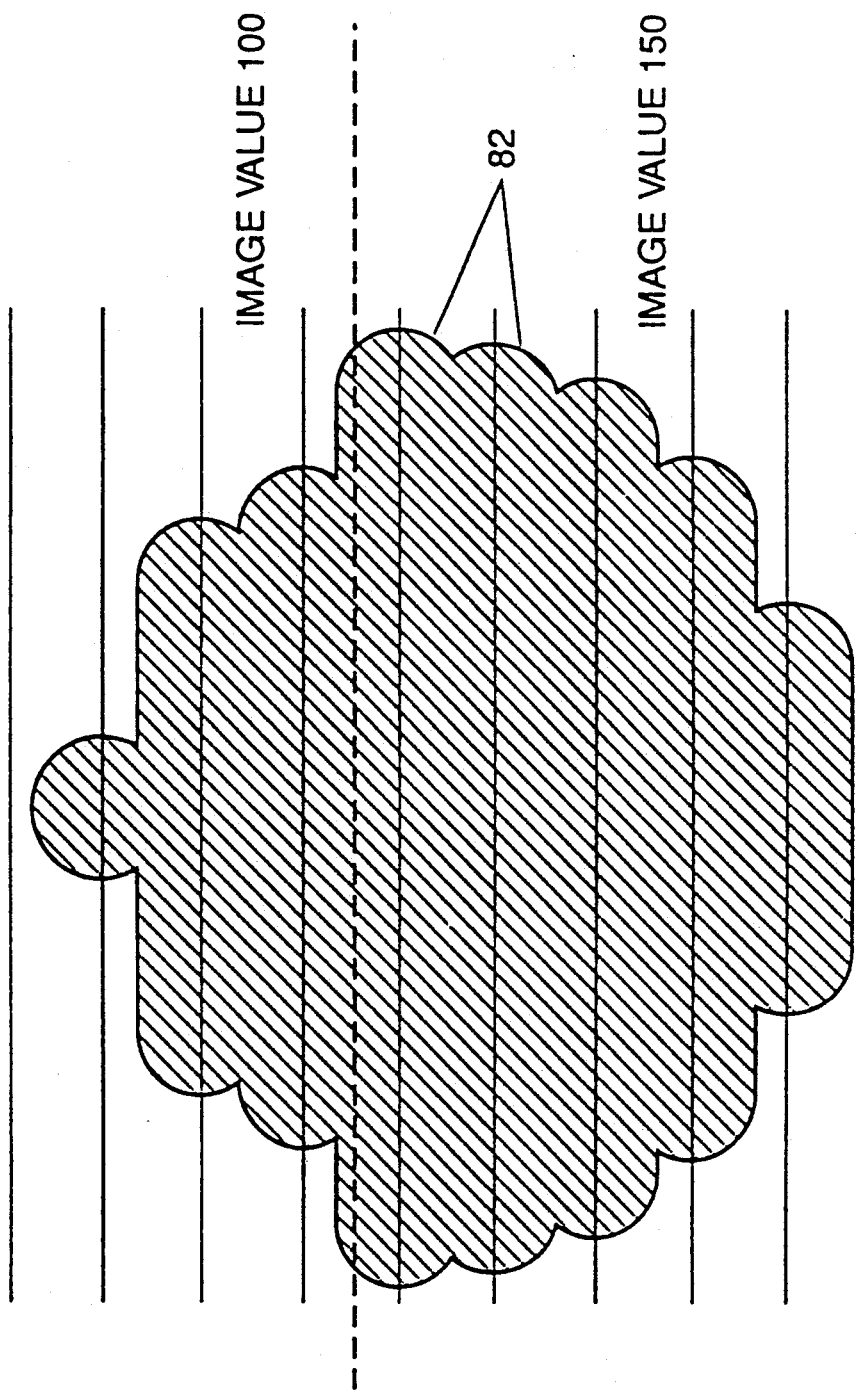
FIG. 6B is an even more detailed illustration of a line by line written screen dot produced in accordance with a preferred embodiment of the invention for a non-uniform input density.

Reference is now made to FIG. 6B, which illustrates the construction of an output dot for portion 42 of the image illustrated in FIGS. 3 and 4. The input density values for the pixels 34 are indicated within each pixel in FIG. 4 and it is seen that they differ from each other.

It is appreciated from a consideration of FIG. 6B that the length of the lines 82 along each portion of the dot is a function of the input density value for the pixel 34 over which such lines lie. Thus, where the input density value is relatively low, such as 100, the dot lines 82 correspond to a relatively small dot area and where the input density value is high, such as 150, the dot lines 82 correspond to a relatively large dot area. An output dot which overlies pixels 34 having different input density values is thus asymmetric in a manner generally corresponding to the asymmetry of the input density values of the pixels 34 represented by the output dot.

It will be appreciated by persons skilled in the art that the present invention is not limited by what has been particularly shown and described hereinabove. Rather the scope of the present invention is defined only by the claims which follow:

I claim:

1. A technique for generating a screened reproduction of an image comprising the steps of:

providing a representation of an original having input density values representing the grey levels of various locations of the original for a given color separation;

defining a desired screen dot arrangement for the image in which threshold values are associated with corresponding locations in an x-y plane;

representing the threshold values for a line in said x-y plane by an analog signal;

comparing in an analog manner the input density values of various locations with corresponding ones of said threshold values represented by said analog signal; and writing screen dots in a line by line fashion, wherein each screen dot is made up of a plurality of lines whose length and location is determined by said comparing step.

2. A technique according to claim 1 and wherein each of said plurality of lines has infinite resolution along its length.

3. A technique according to claim 1 and also including the following steps:

storing the input density values of the original at a first spatial resolution; and storing the threshold values of the desired screen dot arrangement in the form of analog functions.

4. A technique according to claim 1 and also including the following steps:

storing the input density values of the original at a first spatial resolution; and storing the threshold values of the desired screen dot arrangement at a second spatial resolution different from the first resolution.

5. A technique according ot claim 1 and wherein the spacing between adjacent lines in said x-y plane corresponds to the line to line spatial resolution of a plotter used for writing the screen dots.

6. A technique according to claim 4 and wherein the step of storing the threshold values of the desired screen dot for a given line in said x-y plane includes the step of digitally storing the values at a third sampling resolution, which may be different from said first and second resolutions.

7. A technique according to cliam 1 and wherein each said line in said x-y plane lies at an angle corresponding to a screening angle.

8. Apparatus for generating a screened reproduction of an image comprising:

means for providing a representation of an original having input density values representing the grey levels of various locations of the original for a given color separation;

means for defining a desired screen dot arrangement for the image in which threshold values are associated with corresponding locations in an x-y plane;

means for representing the threshold values for a line in said x-y plane by an analog signal;

means for comparing in an analog manner the input density values of various locations with corresponding ones of said threshold values represented by said analog signal; and means for writing screen dots in a line by line fashion, wherien each screen dot is made up of a plurality o lines whose length and location is determined by said means for comparing.

9. Apparatus according to claim 8 and wherein each of said plurality of lines has infinite resolution along its length.

10. Apparatus according to claim 8 and also including:

means for storing the input density values of the original at a first spatial resolution; and means for storing the threshold values of the desired screen dot arrangement in the form of analog functions.

11. Apparatus according to claim 8 and also comprising:

means for storing the input density values of the original at a first spatial resolution; and means for storing the threshold values of the desired screen dot arrangement at a second spatial resolution different from the first resolution.

12. Apparatus according to claim 8 and wherein the spacing between adjacent lines in said x-y plane corresponds to the line to line spatial resolution of a plotter used for writing the screen dots.

13. Apparatus according to claim 11 and wherein the means for storing the threshold values of the desired screen dot for a given line in said x-y plane includes means for digitally storing the values at a third sampling resolution, which may be different from said first and second resolutions.

14. Apparatus according to claim 8 and wherein each said line in said x-y plane lies at an angle corresponding to a screening angle.

* * * * *